S. B. HART.
Adjustable Feed-Plate for Corn-Planters.
No. 227,771. Patented May 18, 1880.
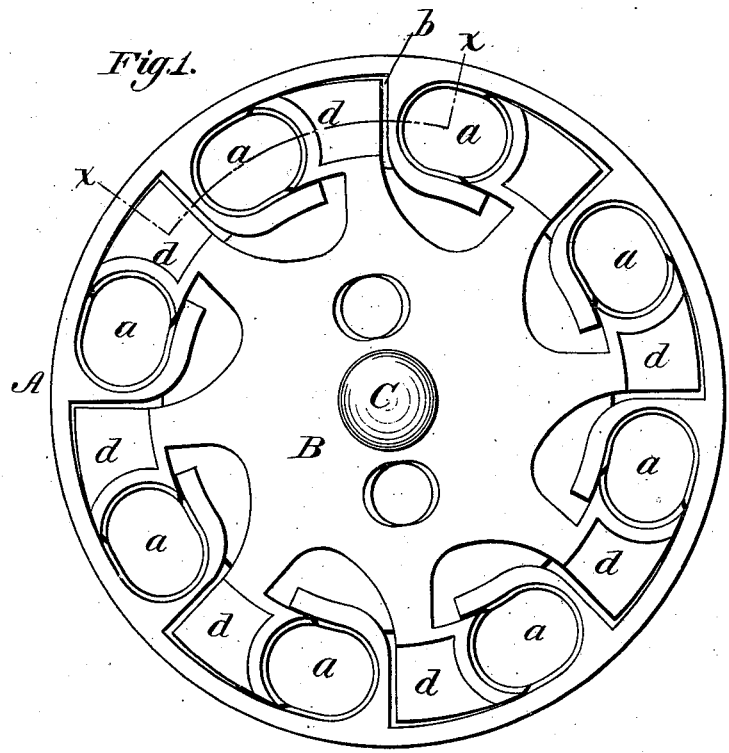
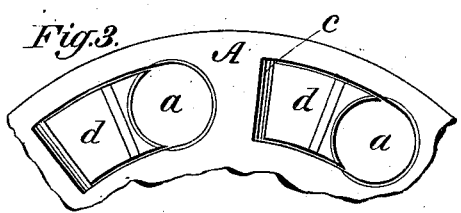
Witnesses: Inventor:

UNITED STATES PATENT OFFICE.

STACY B. HART, OF PEORIA, ILLINOIS.

ADJUSTABLE FEED-PLATE FOR CORN-PLANTERS.

SPECIFICATION forming part of Letters Patent No. 227,771, dated May 18, 1880.

Application filed March 13, 1879.

*To all whom it may concern:*

Be it known that I, STACY B. HART, of Peoria, in the county of Peoria and State of Illinois, have invented certain Improvements in Adjustable Feed-Plates for Corn-Planters, of which the following is a specification.

My invention relates to those rotary horizontal feeding-disks which have a series of vertical feed cells or openings through them; and the object of the invention is to provide for an instantaneous change in the size of the cells without producing shoulders or recesses against which the grain can lodge or be broken.

To this end it consists in constructing the plate in two parts or sections adjustable one upon the other, and of such form that the cells have at all times unbroken walls from top to bottom.

Figure 1 represents a bottom-plan view of my plate; Fig. 2, a vertical section of the same on the line $x\,x$; Fig. 3, a top-plan view.

A represents the top and main section of the plate, made in a circular form and provided with a series of cells or openings, $a$, which are elongated horizontally and made round at one end and square at the other. On the under side the plate is cut away or recessed at the center, and thence outward to the rectangular end of each cell in such manner as to remove the wall of the cell on that side and leave only a thin overhanging lip, $b$, at the top, as shown in Fig. 2, the lip being beveled inward on the upper side toward the opening, as shown at $c$.

The under plate, B, is adapted to fit within the under side of a plate, A, and has a series of radial arms, $d$, which fit within the cells or openings of plate A in such a manner as to form movable sides therefor in place of the sides which were cut away, as described.

It will be seen that when plate B is in place each seed-cell has one side formed by the metal of plate A and the other side formed by the end of one of the arms $d$, which is made concave, in order to give the cell a circular or elliptical form. By turning the plate B horizontally within the top plate the ends of arms $d$ may be moved to and from the stationary sides of the cells, and the latter thereby diminished or increased in size, as required.

It is to be particularly noted as one of the important features of my invention that the ends of the arms $d$ extend through the plate A from the upper to the lower side, so that the movable side of each cell, like the other, is continuous and without break or shoulder from top to bottom. The adjustment of the plates does not change the cells in the above regard, the sides or walls of each cell being at all times continuous and without shoulders, offsets, or recesses upon or in which the corn can lodge.

The arms $d$ have their rear ends cut away slightly on the upper side and arranged beneath the lips $b$, as shown, whereby the corn is prevented from falling behind the arms.

As shown in Fig. 2, the depressed portion of each arm terminates in an incline, $e$, against which the corn will not lodge securely.

The two plates may be united by means of bolts passing through slots therein, or by any other suitable means, and, aside from the features described, they may be of any suitable construction.

The essential feature of the invention is the construction of the rotary plates in such manner that the cells may be adjusted in size without producing shoulders therein, and it is manifest that this may be accomplished without adhering to the precise form of parts shown.

I am aware that attempts have been made to produce adjustable cells by combining two perforated plates arranged to turn one upon the other, the construction being such that a change in the size of the cells produced shoulders therein.

I am also aware that a feed-plate has been provided with a series of sliding tongues pivoted to and moved by means of a special plate, and also that a plate having cells therein has been combined with a plate having tongues to vary the size of the cells, the arrangement being such that the forward adjustment of the tongues produced openings in the plate behind them, so that the plate could be operated only with a vibratory and not with a rotary motion.

In the drawings a central bolt, C, connects the two plates and serves to clamp them together.

Having thus described my invention, what I claim is—

1. The rotary plate A, provided with the series of elongated cells $a$ and with the overhanging lips $b$ at the ends of the cells, in combination with the rotary adjustable plate B, having the arms *d*, adapted and arranged to fill the cells on one side and to fit beneath the lips, as shown and described.

2. The rotary feed-plate consisting of the plate A, having the elongated cells, and the lips *b*, with beveled ends *c*, and the plate B, having arms *d*, the latter having their front ends extended upward to the top of plate A, and their rear ends beveled or inclined downward sufficiently to pass beneath lips *b*.

3. A feed-plate adapted to receive a rotary movement in one direction, consisting of but three pieces—viz., the plate A, having elongated cells, the plate B, having arms adapted to extend through the cells to the top of the plate, and a centrally-applied clamping-bolt, arranged as shown, to draw and hold the faces of the two plates together.

4. In a rotary feeding device, the combination of a plate provided with a series of elongated cells and a second plate mounted concentrically with the first and adjustable upon its axis, said plates being constructed substantially in the manner described and shown, so that the adjustment of the second varies the size of the cells in the first without producing shoulders therein and without producing recesses or openings other than the cells in which the grain can lodge.

STACY B. HART.

Witnesses:
P. T. DODGE,
DONN I. TWITCHELL.